United States Patent
Dallum

(10) Patent No.: US 10,850,843 B2
(45) Date of Patent: Dec. 1, 2020

(54) ROLLER ASSEMBLY OF A CARGO LOADING SYSTEM

(71) Applicant: Advanced Aircraft Roller Systems, Inc., Ramsey, MN (US)

(72) Inventor: John Dallum, Ramsey, MN (US)

(73) Assignee: Advanced Aircraft Roller Systems, Inc., Ramsey, MN (US)

( * ) Notice: Subject to any disclaimer, the term of this patent is extended or adjusted under 35 U.S.C. 154(b) by 0 days.

(21) Appl. No.: 16/400,820

(22) Filed: May 1, 2019

(65) Prior Publication Data

US 2019/0337622 A1 Nov. 7, 2019

Related U.S. Application Data

(60) Provisional application No. 62/666,350, filed on May 3, 2018.

(51) Int. Cl.
*B64D 9/00* (2006.01)
*B65G 67/00* (2006.01)
*F16C 17/04* (2006.01)

(52) U.S. Cl.
CPC .............. *B64D 9/00* (2013.01); *B65G 67/00* (2013.01); *F16C 17/04* (2013.01); *B64D 2009/006* (2013.01); *F16C 2326/58* (2013.01)

(58) Field of Classification Search
CPC ........ F16C 2326/58; F16C 17/04; B64D 9/00; B64D 2009/006; B65G 67/00; B65G 39/12; B65G 13/12
USPC .......................... 193/35 MD, 35 SS; 198/782
See application file for complete search history.

(56) References Cited

U.S. PATENT DOCUMENTS

| | | | |
|---|---|---|---|
| 736,027 A | 8/1903 | Sauer | |
| 1,305,330 A | 6/1919 | Wolever et al. | |
| 2,258,268 A | 10/1941 | Sparks et al. | |
| 2,572,276 A | 10/1951 | Moe | |
| 2,672,306 A | 3/1954 | Doolittle et al. | |
| 2,886,156 A | 5/1959 | Halbron | |
| 3,257,133 A * | 6/1966 | Wight ................ | F16C 11/0666 403/40 |
| 3,293,728 A | 12/1966 | Hill | |
| 3,711,912 A | 1/1973 | Teske et al. | |
| 3,797,082 A | 3/1974 | Brunes | |
| 3,815,196 A | 6/1974 | Gotham et al. | |
| 3,913,729 A | 10/1975 | Andrews | |
| 4,168,771 A | 9/1979 | Krivec | |
| 4,203,509 A | 5/1980 | Thompson et al. | |
| 4,213,523 A | 7/1980 | Frost et al. | |

(Continued)

FOREIGN PATENT DOCUMENTS

| | | |
|---|---|---|
| BE | 671076 | 11/1965 |
| DE | 295 05 461.1 | 7/1995 |

(Continued)

OTHER PUBLICATIONS

"Compressive Strength Testing of Plastics," [online], Dec. 1, 2007, matweb.com.
"Delrin® AF Blend" Properties, prior art as of May 13, 2018.

*Primary Examiner* — James R Bidwell
(74) *Attorney, Agent, or Firm* — Merchant & Gould P.C.

(57) ABSTRACT

A cargo handling system that enables rollers to swivel without the need for the inclusion of metal thrust bearings. A method of assembling and retrofitting existing conventional type swivel caster style wheels is also provided.

15 Claims, 8 Drawing Sheets

(56) References Cited

U.S. PATENT DOCUMENTS

| | | | |
|---|---|---|---|
| 4,312,444 A | | 1/1982 | Mushovic |
| 4,382,637 A | * | 5/1983 | Blackburn ............ B65G 39/025 16/25 |
| 4,440,295 A | | 4/1984 | Blackwood-Murray et al. |
| 4,681,203 A | | 7/1987 | Kornylak |
| 4,766,996 A | | 8/1988 | Gibson |
| 4,790,421 A | | 12/1988 | Gorges |
| 4,838,986 A | | 6/1989 | Rhoades et al. |
| 4,913,277 A | * | 4/1990 | Zorgiebel ............... B65G 13/10 198/369.4 |
| 4,998,497 A | * | 3/1991 | Nelson ................... B63B 21/00 114/230.19 |
| 5,217,099 A | | 6/1993 | Marcus et al. |
| 5,381,887 A | | 1/1995 | Emmons |
| 5,542,900 A | | 8/1996 | Burke |
| 5,568,858 A | * | 10/1996 | Thompson ........... B65G 13/065 198/781.06 |
| 5,655,642 A | | 8/1997 | Lawrence et al. |
| 5,806,131 A | | 9/1998 | Tennant |
| 5,893,821 A | | 4/1999 | Ando et al. |
| 6,044,963 A | | 4/2000 | Lerch et al. |
| 6,105,249 A | | 8/2000 | Ando et al. |
| 6,113,059 A | | 9/2000 | Couillard |
| 6,354,424 B1 | | 3/2002 | Rowles |
| 6,516,933 B1 | | 2/2003 | Ledingham |
| 7,771,333 B2 | | 8/2010 | Spiess et al. |
| 8,109,702 B2 | | 2/2012 | Stegmiller et al. |
| 8,430,801 B2 | | 4/2013 | Dallum et al. |
| 2003/0014833 A1 | * | 1/2003 | Saggio ................ B60B 33/0018 16/18 R |
| 2006/0251510 A1 | * | 11/2006 | Gray ........................ F03D 3/02 415/121.2 |
| 2007/0237598 A1 | | 11/2007 | Schulze |
| 2008/0217138 A1 | * | 9/2008 | Fourney ................. B65G 47/34 198/782 |
| 2009/0151124 A1 | * | 6/2009 | Forrest ...................... E05D 5/14 16/374 |
| 2009/0324356 A1 | | 12/2009 | Schulze et al. |
| 2010/0054889 A1 | * | 3/2010 | Stegmiller ............... B64D 9/00 410/92 |
| 2016/0288359 A1 | * | 10/2016 | Patrick ..................... B27B 5/32 |

FOREIGN PATENT DOCUMENTS

| | | |
|---|---|---|
| EP | 0 683 438 A2 | 11/1995 |
| GB | 2 124 333 A | 2/1984 |
| JP | 2000-136287 | 5/2000 |

* cited by examiner

FIG. 6

Delrin® AF Blend

Delrin® AF Blend acetal is a unique thermoplastic material for use in moving parts in which low friction and long wear are important. It is a combination of Teflon® fibers uniformly dispersed in Delrin® acetal resin. This combination produces a material that has strength, toughness, dimensional stability and good machinability, plus improved wear characteristics over unfilled Delrin®. The natural color of Delrin® AF Blend is dark brown.

| Property | ASTM Test Method | Units | Delrin® AF Blend |
|---|---|---|---|
| Physical | | | |
| Specific Gravity | D792 | | 1.5 |
| Water Absorption Immersion, 24 hr | D570 | % | 0.2 |
| Water Absorption Immersion, Sat | D570 | % | 1 |
| Mechanical | | | |
| Tensile Strength | D638 | psi | 8,000 |
| Tensile Modulus | D638 | psi | 435,000 |
| Elongation | D638 | % | 15 |
| Flexural Strength | D790 | psi | 12,000 |
| Flexural Modulus | D790 | psi | 445,000 |
| Shear Strength | D732 | psi | 7,600 |
| Compressive Strength | D695, 10% Def. | psi | 16,000 |
| Compressive Modulus | D695 | psi | 350,000 |
| Hardness, Rockwell | D785 | | M85, R115 |
| Hardness, Durometer, Shore D Scale | D2240 | | 83 |
| Izod Impact (Notched) | D256 Type A | ft-lb/in | 0.7 |
| Coefficient of Friction, Dynamic | Dry vs. Steel PTM55007 | | 0.19 |
| Limiting PV | PTM55007 | psi-fpm | 8300 |
| k (wear) factor | PTM55007 | $10^{-10} in^2$-min/lb-ft-hr | 60 |
| Thermal | | | |
| Coefficient of Thermal Expansion | ASTM E831 (TMA) | °F | $0.5 \times 10^{-4}$ |
| Deflection Temperature, @264 psi | D648 | °F | 244 |
| Melting Point (Crystalline) Peak | | °F | 347 |
| Continuous Service in Air (Max) | Without Load | °F | 180 |
| Flammability | UL94 | | HB |
| Electrical | | | |
| Dielectric Strength, Short Term | D149 (2) | V/mil | 400 |
| Surface Resistance | Lower Limit: EOS/ESD S11.11 | ohm/square | $10^{13}$ |
| Dielectric Constant, 1 MHz | D150 (2) | | 3.1 |
| Dissipation Factor, 1 MHz | D150 (2) | | 0.01 |

ROLLER ASSEMBLY OF A CARGO LOADING SYSTEM

CROSS-REFERENCE TO RELATED APPLICATION

The present application claims the benefit of U.S. Provisional Patent Application Ser. No. 62/666,350, filed May 3, 2018, which application is hereby incorporated by reference in its entirety.

TECHNICAL FIELD

The present disclosure provides a maintenance free roller type caster assembly.

BACKGROUND

Cargo handling systems have numerous applications including, for example, conveying and securing cargo on the lower deck on passenger aircraft and on the main deck of freighter aircraft. Items that are shipped by air typically are loaded onto specially configured pallets, or into specially configured containers. In the air freight industry, these various pallets and containers are commonly referred to as Unit Load Devices (ULDs), which are available in various sizes, shapes and capacities. Additional information relating to cargo handling systems for aircraft can be found in U.S. Pat. No. 8,430,801; U.S. Pat. No. 7,771,333; U.S. Pat. No. 8,109,702, United States Patent Publication No. 2009/0324356; and United States Patent Publication No. US 2007/0237598, all of which are incorporated by reference herein in their entirety.

A typical cargo handling system consists of, among other components, conveyor rollers that facilitate movement of a ULD within an aircraft's cargo compartment. The deck of an aircraft cargo compartment typically includes a number of raised roller elements. These roller elements often include elongated roller trays that extend longitudinally along the length of the cargo deck, ball panel units, and the like. For example, roller trays typically include elongated rows of cylindrical rollers that extend in a fore and aft direction. Ball panel units include plates with upwardly protruding rotatable spherical balls or wheels that swivel about a vertical axis.

The ULDs sit atop these roller elements, and the roller elements facilitate rolling movement of the ULDs within the cargo compartment. The apex of these roller elements can form what is known in the art as the conveyor plane. The conveyor plane &so refers to a bottom plane on which a ULD (with a completely flat underside) traverses.

Metal thrust bearings are often used to enable the swiveling motion of the rollers. Over time, the metal thrust bearings require maintenance such as lubrication, etc. There exists a need for robust cargo handling systems requiring less maintenance.

SUMMARY

The present disclosure provides a cargo handling system that enables rollers to swivel without the need for the inclusion of metal thrust bearings. A method of assembling and retrofitting existing swivel caster style rollers is also provided.

BRIEF DESCRIPTION OF THE FIGURES

FIG. 6 is a table with the material properties of a suitable material for use on the thrust bearing component of the roller assembly of FIG. 1.

DETAILED DESCRIPTION

Figure 1:
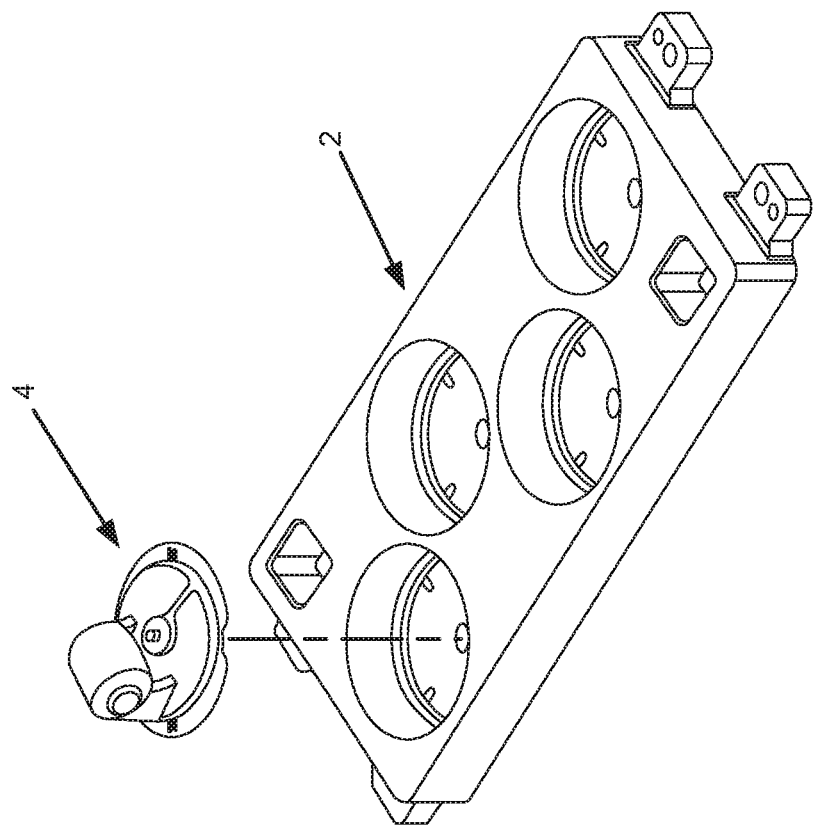
FIG. 1 is a roller assembly according to one embodiment of the present disclosure.

Referring to FIGS. 1-6, the present invention is described in further detail. Referring to FIG. 1, an embodiment of a cargo handling system of the present disclosure is shown. In the depicted embodiment, the cargo handling system includes a guide that is in the form of a caster panel 2. The caster panel 2 is configured to be mounted to the floor of an aircraft cargo area. The caster panel 2 includes a plurality of apertures for receiving and securing roller assemblies 4 that are in the form of casters.

Figure 2:
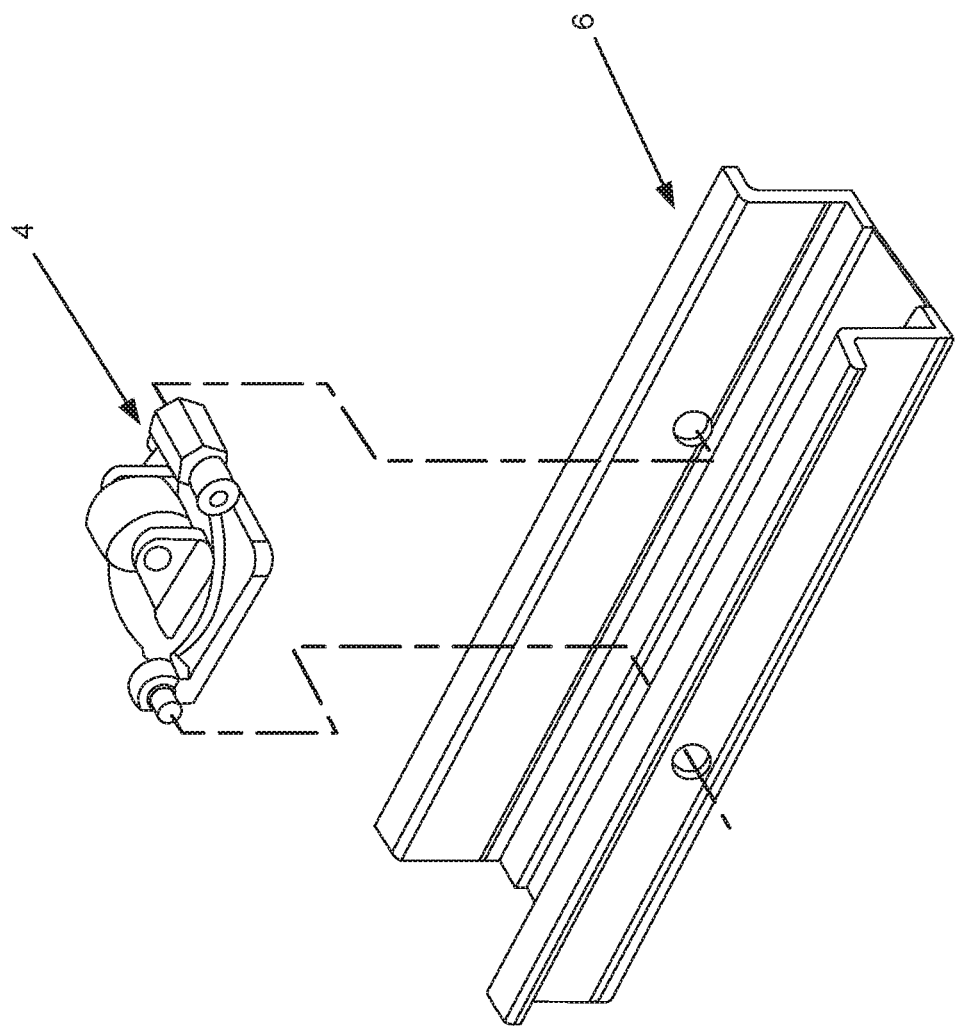
FIG. 2 is a roller assembly according to an alternative embodiment of the present disclosure.

Referring to FIG. 2, an alternative embodiment of a cargo handling system of the present disclosure is shown. In the depicted embodiment, a roller assembly 4 is configured to be mounted to a channel/track 6. The channel 6 is configured to be mounted to or embedded into the floor of an aircraft cargo area. It should be appreciated that the caster panel 2 and the channel 6 could be secured to any surface in which cargo handling is desired. The present disclosure has applicability far beyond the aircraft context.

Figure 3:
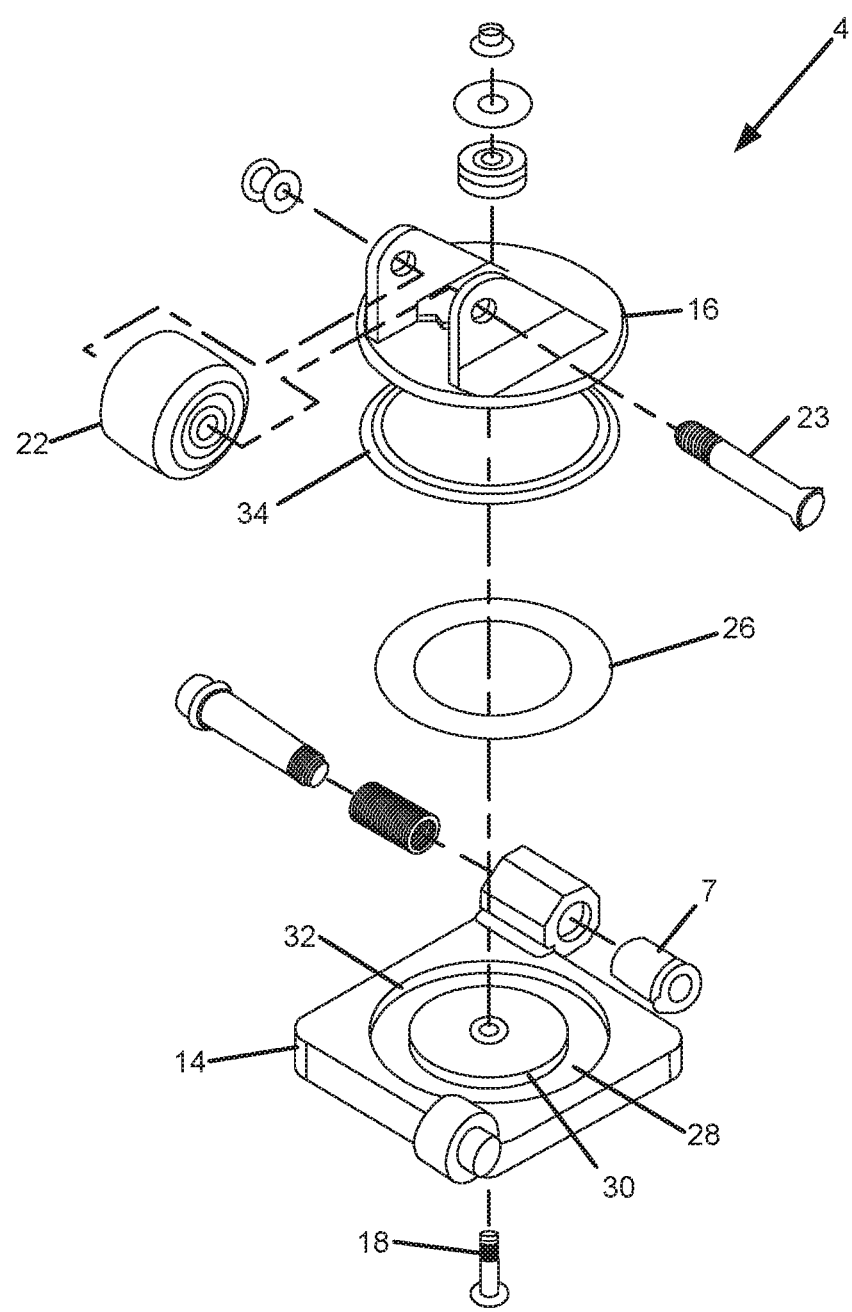
FIG. 3 is an exploded assembly view of the roller assembly of FIG. 1.
Figure 4:
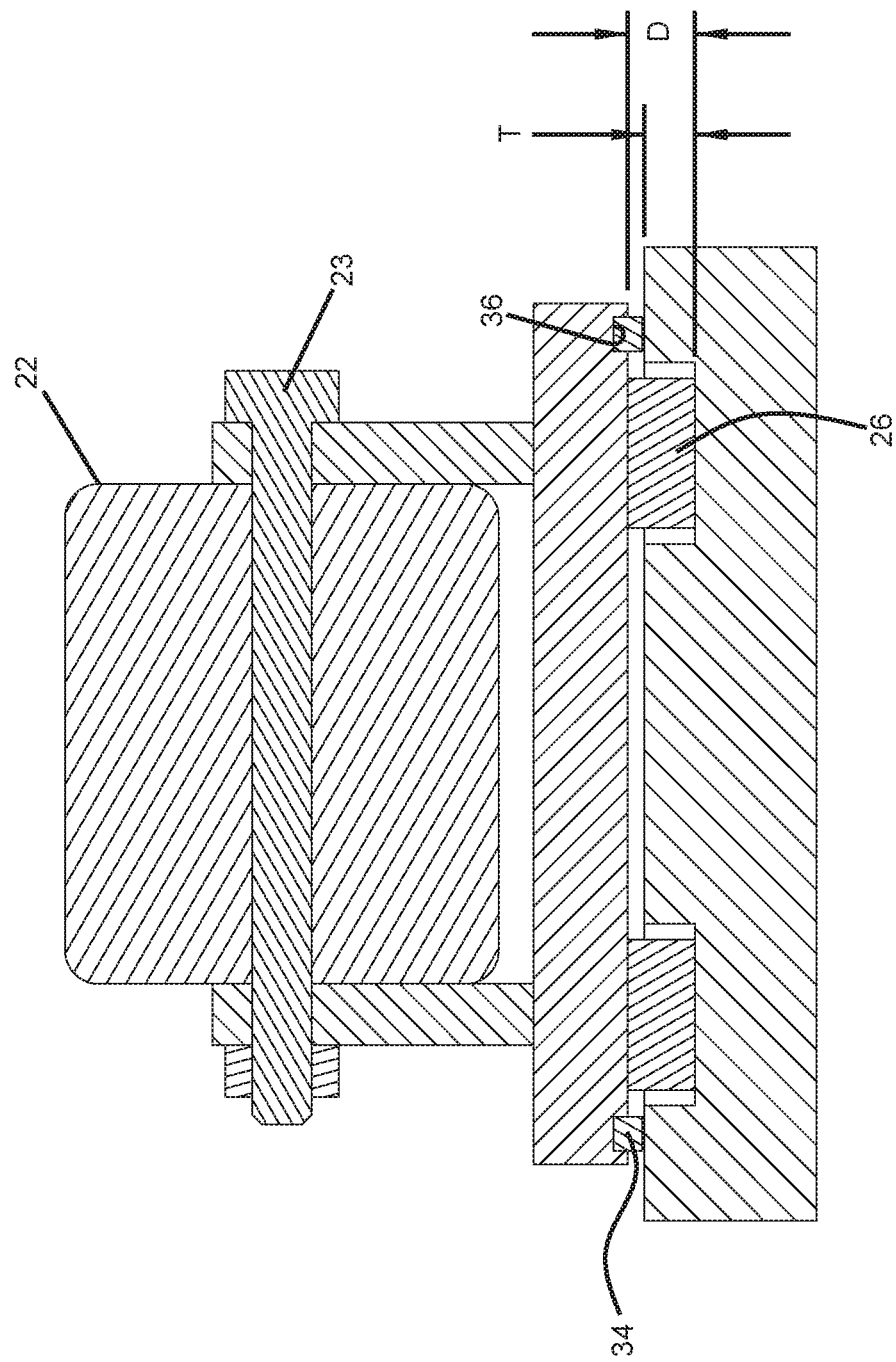
FIG. 4 is a partial cross-sectional view of the roller assembly of FIG. 1.
Figure 5A:
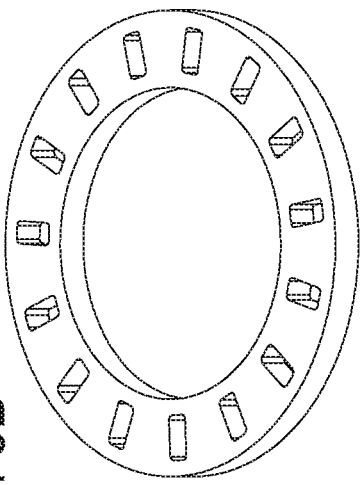
FIGS. 5A-5J are perspective views of a component (thrust bearing) of the roller assembly of FIG. 1.
Figure 5B:
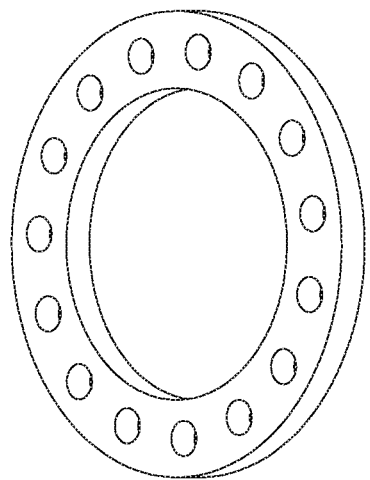
Figure 5C:
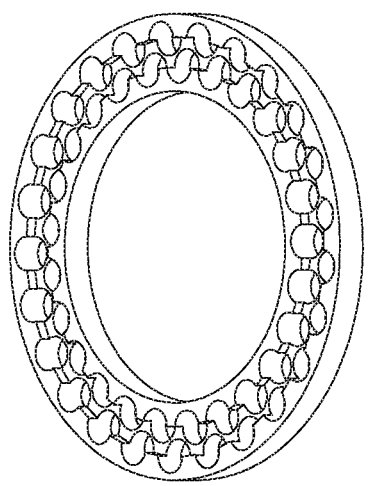
Figure 5D:
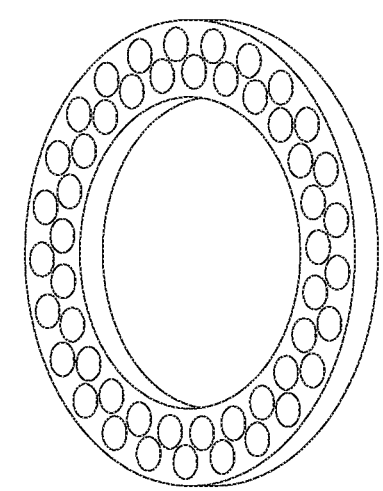
Figure 5F:
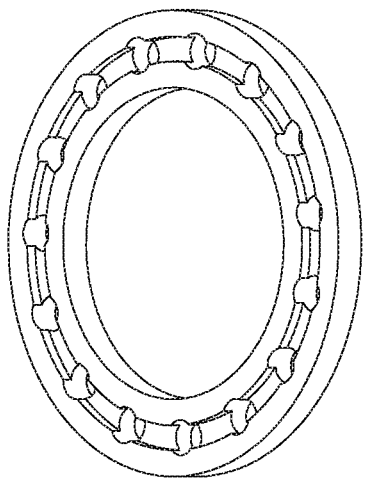
Figure 5H:
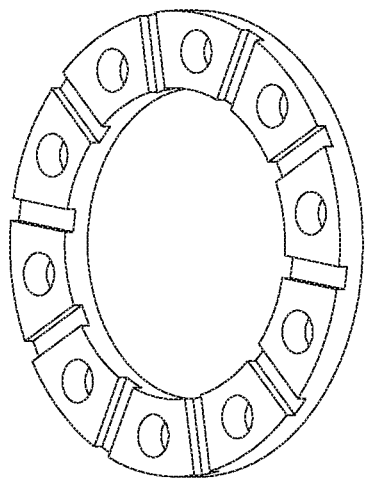
Figure 5E:
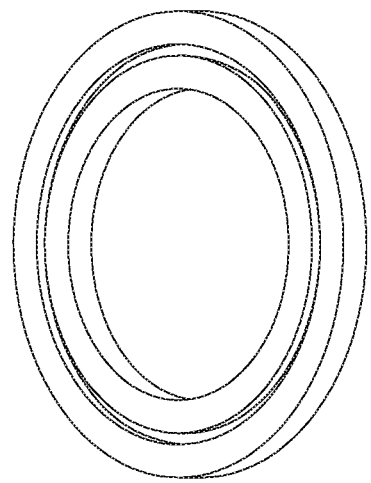
Figure 5G:
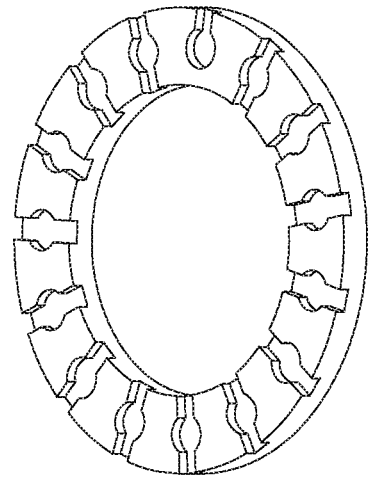
Figure 5J:
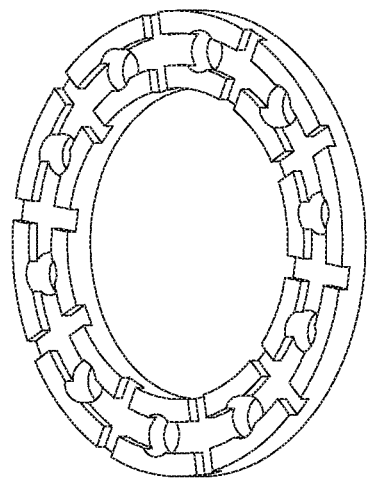
Figure 5I:
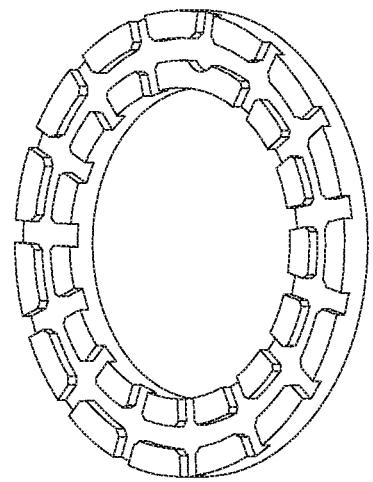

Referring to FIG. 3, an exploded assembly view of the roller assembly 4 is shown. In the depicted embodiment, the roller assembly 4 includes a base 14 and a roller support bracket 16. In the depicted embodiment, the roller support bracket 16 is configured to rotate relative to the base about a vertical axis. The base 14 and roller support bracket 16 swivel relative to each other. In the depicted embodiment, a bolt assembly 18 defines the vertical swivel axis.

In the depicted embodiment, the roller support bracket 16 is configured to support a roller 22 in a manner to allow the roller 22 to rotate about a horizontal axis. In the depicted embodiment, a bolt assembly 23 defines the horizontal rotational axis about which the roller 22 rotates.

In the depicted embodiment, the roller assembly 4 includes a nonmetallic thrust bearing 26 located between the base 14 and the roller support bracket 16. In the depicted embodiment, the thrust bearing 26 is positioned partially within a bearing pocket 28. In the depicted embodiment, the bearing pocket 28 is an annular recess in the base 14. In the depicted embodiment, a bearing pocket 28 includes an inner cylindrical guide surface 30 and an outer cylindrical guide surface 32. In the depicted embodiment, the thrust bearing 26 has a thickness T and the bearing pocket 28 has a depth D. According to one example embodiment, the thickness T of the thrust bearing 26 is greater than the depth D of the bearing pocket 28.

In the depicted embodiment, the roller assembly 4 includes an o-ring 34 positioned between the base 14 and the roller support bracket 16. In the depicted embodiment, the o-ring 34 has a diameter larger than the thrust bearing 26 and is concentrically arranged with the thrust bearing 26. In the depicted embodiment, the o-ring 34 is seated within an annular groove 36 in the roller support bracket 16. In the depicted embodiment, the o-ring 34 preferably projects from the surface of the roller support bracket 16 a distance less than the difference between the thickness T of the thrust bearing 26 and the depth D of the bearing pocket 28.

In the depicted embodiment, the thrust bearing 26 is nonmetallic. In the depicted embodiment, the thrust bearing 26 is constructed of plastic and includes acetal. In this particular embodiment, the entire thrust bearing 26 is constructed of Delrin®. FIG. 6 illustrates a table with the material properties of a suitable material (Delrin® AF blend) for the thrust bearing 26. It should be appreciated that many alternative constructions are possible including composite multi-material constructions. The structure and configuration of the thrust bearings 26 can also take a number of different embodiments. FIGS. 5A-5J depict some of the various thrust bearing configurations. In some depicted embodiments, the thrust bearing includes recesses, grooves, and channels in the upper and lower surfaces. These feature can be beneficial in providing a space for contaminates to collect, thereby preventing or limiting contaminates from collecting between the working surface of the thrust bearing and the surface that it slides against (e.g., the surface of the support bracket or base). It should be appreciated that many alternative configurations exist.

In one embodiment, the roller assembly 4 is particularly configured as part of an aircraft cargo handling system, and the roller assembly 4 takes the form of a unicaster swivel assembly. The base 14 is a swivel frame configured to be directly or indirectly (via tracks or a caster panel) secured to the floor of a cargo area in an aircraft, the roller support bracket 16 is a cargo roller support bracket 16 configured to rotate relative to the swivel frame about a vertical axis, and the thrust bearing 26 is a nonmetallic thrust bearing 26 positioned between the swivel frame and the cargo roller support bracket 16.

A method of retrofitting a roller assembly 4 is also provided. The method includes the steps of separating a base 14 from a roller support bracket 16, replacing a conventional metal thrust bearing located between the base 14 and the roller support bracket 16 with an annular acetal disk defining the thrust bearing 26 having features that are examples of inventive aspects in accordance with the present disclosure, and reconnecting the base 14 to the roller support bracket 16. In the above described method, the step of separating the base 14 from the roller support bracket 16 includes unbolting the roller support bracket 16 from the base 14. As discussed above, the acetal disk defining the inventive thrust bearing 26 can be configured to be partially seated within a bearing pocket 28 defined by an annular groove in the base 14. The annular groove can have a depth that is less than the thickness of the annular acetal disk defining the bearing 26.

The present disclosure may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is Claimed is:

1. A roller assembly including:
   a base;
   a roller support bracket configured to rotate relative to the base about a vertical axis, wherein the base and roller support bracket cooperatively define an annular bearing pocket positioned between the base and the roller support bracket;
   a thrust bearing positioned at least partially within the bearing pocket, wherein the thrust bearing includes a nonmetallic construction; and
   an o-ring positioned between the base and the roller support bracket, wherein the o-ring is seated within an annular groove in the roller support bracket.

2. The roller assembly of claim 1, wherein the thrust bearing is constructed of a polymeric material.

3. The roller assembly of claim 1, wherein the thrust bearing is constructed of acetal.

4. The roller assembly of claim 1, wherein the thrust bearing is constructed of Delrin®.

5. The roller assembly of claim 1, wherein the bearing pocket includes an inner guide surface and an outer guide surface.

6. The roller assembly of claim 1, wherein the bearing pocket includes an inner cylindrical guide surface and an outer cylindrical guide surface.

7. The roller assembly of claim 1, wherein the thrust bearing has a thickness T and the bearing pocket has a depth D, and wherein the thickness T of the thrust bearing is greater than the depth D of the bearing pocket.

8. The roller assembly of claim 7, wherein the o-ring has a diameter larger than the thrust bearing and is concentrically arranged with the thrust bearing.

9. The roller assembly of claim 8, wherein the o-ring projects from a surface of the roller support bracket a distance less than the difference between the thickness T of the thrust bearing and the depth D of the bearing pocket.

10. A method of retrofitting a conventional roller assembly including the steps of:
    separating a base from a roller support bracket;
    replacing a metal thrust bearing located between the base and the roller support bracket with an annular acetal disk, wherein the annular acetal disk is configured to be partially seated within a bearing pocket defined by an annular groove in the base; and
    reconnecting the base to the roller support bracket.

11. The method of claim 10, wherein the step of separating the base from the roller support bracket includes unbolting the roller support bracket from the base.

12. The method of claim 10, wherein the annular groove has a depth that is less than a thickness of the annular acetal disk.

13. An aircraft cargo handling system including:
    a unicaster swivel assembly that includes:
       a swivel frame configured to be secured to the floor of a cargo area in an aircraft;
       a cargo roller support bracket configured to rotate relative to the swivel frame about a vertical axis;
       a nonmetallic thrust bearing positioned between the swivel frame and the cargo roller support bracket; and
       an o-ring positioned between the swivel frame and the cargo roller support bracket, wherein the o-ring is seated within an annular groove in the cargo roller support bracket.

14. The aircraft cargo handling system of claim 13, wherein the swivel frame is configured to be secured to a track that is configured to be secured to the floor structure of an aircraft.

15. The aircraft cargo handling system of claim 13, wherein the swivel frame is configured to be secured to a caster panel that is configured to be secured to the floor of an aircraft.

* * * * *